United States Patent [19]
Fluet

[11] 4,095,275
[45] June 13, 1978

[54] PULSE WIDTH MODULATED SINE COSINE GENERATOR

[75] Inventor: Francis A. Fluet, Longwood, Fla.

[73] Assignee: Westinghouse Electric Corp., Pittsburgh, Pa.

[21] Appl. No.: 768,130

[22] Filed: Feb. 14, 1977

[51] Int. Cl.² ............................................ G06F 15/34
[52] U.S. Cl. .................................... 364/721; 364/746
[58] Field of Search .................. 235/197, 150.53, 156, 235/152, 92 CP, 92 DP, 92 CT, 92 CC

[56] References Cited
U.S. PATENT DOCUMENTS

| | | | |
|---|---|---|---|
| 3,657,657 | 4/1972 | Jefferson | 235/197 X |
| 3,676,655 | 7/1972 | Ancona | 235/197 X |
| 3,727,037 | 4/1973 | Zorn | 235/150.53 |
| 3,824,559 | 7/1974 | Grundy | 235/197 X |
| 3,980,874 | 9/1976 | Vora | 235/175 |

*Primary Examiner*—Joseph F. Ruggiero
*Attorney, Agent, or Firm*—J. J. Wood

[57] ABSTRACT

The disclosure relates to a pulse width modulated sine-cosine wave generator in which all bits of a first counter, save the most significant bit, address a read only memory (ROM) which has a programmed output for each address. The ROM has sine and cosine half cycle bit outputs (logic ONES and ZEROES). The remaining bit outputs of the ROM are applied to control a variable modulo counter. When the variable modulo counter counts to its capacity or modulo, it is load enabled, and an end of state signal is sent to the first counter which then advances to its next state. When the variable modulo counter is enabled, it receives the ROM output which results from the previous state of the first counter. Thus, every time the first counter changes state, the ROM has impending a modulo output to apply to the input of the variable modulo counter; however, this modulo will not be loaded into the variable modulo counter until it has counts to existing modulo which is a function of the previous state of the first counter. Since the magnitude of the modulo of the variable modulo counter determines how long the first counter will remain in any one state, it therefore determines the duration of the ONES and ZEROES of the sine and cosine half cycle outputs of the ROM, and hence, the pulse width wave pattern. The most significant bit of the first counter, and the sine and cosine half wave ROM bit outputs, are applied to circuitry for algebraic logic operations to derive pulse width modulated sine and cosine waves.

8 Claims, 5 Drawing Figures

FIG. 2A

| LINE NO. | HEX CODE | | BINARY CODE | | | | | | | | | MODULI (NEXTSTATE) |
|---|---|---|---|---|---|---|---|---|---|---|---|---|
| | | | Q1 | Q2 | Q3 | Q4 | Q5 | Q6 | Q7 | Q8 | |
| 0 | E | 9 | 1 | 0 | 0 | 1 | 0 | 1 | 1 | 1 | 23 |
| 1 | D | D | 1 | 0 | 1 | 1 | 1 | 0 | 1 | 1 | 35 |
| 2 | 6 | 0 | 0 | 0 | 0 | 0 | 0 | 1 | 1 | 0 | 32 |
| 3 | E | 0 | 0 | 0 | 0 | 0 | 0 | 1 | 1 | 1 | 32 |
| 4 | E | 6 | 0 | 1 | 1 | 0 | 0 | 1 | 1 | 1 | 26 |
| 5 | 4 | F | 1 | 1 | 1 | 1 | 0 | 0 | 1 | 0 | 49 |
| 6 | F | F | 0 | 1 | 1 | 1 | 1 | 1 | 1 | 1 | 14 |
| 7 | A | 2 | 0 | 0 | 1 | 0 | 0 | 1 | 0 | 1 | 32 |
| 8 | F | 0 | 0 | 1 | 0 | 0 | 1 | 1 | 1 | 1 | 14 |
| 9 | 4 | 2 | 0 | 0 | 1 | 0 | 0 | 0 | 1 | 0 | 49 |
| A | E | 6 | 0 | 1 | 1 | 0 | 0 | 1 | 1 | 1 | 26 |
| B | A | 0 | 0 | 0 | 0 | 0 | 0 | 1 | 0 | 1 | 32 |
| C | E | 0 | 0 | 0 | 0 | 0 | 0 | 1 | 1 | 1 | 32 |
| D | D | 9 | 1 | 0 | 0 | 1 | 1 | 0 | 1 | 1 | 35 |
| E | 9 | 2 | 0 | 1 | 0 | 0 | 1 | 0 | 0 | 1 | 46 |
| F | E | 9 | 1 | 0 | 0 | 1 | 0 | 1 | 1 | 1 | 23 |

FIG. 2B

| LINE NO. | HEX CODE | | BINARY CODE | | | | | | | | | MODULI (NEXTSTATE) |
|---|---|---|---|---|---|---|---|---|---|---|---|---|
| | | | Q1 | Q2 | Q3 | Q4 | Q5 | Q6 | Q7 | Q8 | |
| 0 | A | 9 | 1 | 0 | 0 | 1 | 0 | 1 | 0 | 1 | 23 |
| 1 | 9 | D | 1 | 0 | 1 | 1 | 1 | 0 | 0 | 1 | 35 |
| 2 | E | 0 | 0 | 0 | 0 | 0 | 0 | 1 | 1 | 1 | 32 |
| 3 | A | 0 | 0 | 0 | 0 | 0 | 0 | 1 | 0 | 1 | 32 |
| 4 | A | 6 | 0 | 1 | 1 | 0 | 0 | 1 | 0 | 1 | 26 |
| 5 | C | F | 1 | 1 | 1 | 1 | 0 | 0 | 1 | 1 | 49 |
| 6 | B | 2 | 0 | 0 | 1 | 0 | 1 | 1 | 0 | 1 | 14 |
| 7 | 2 | 0 | 0 | 0 | 0 | 0 | 0 | 1 | 0 | 0 | 32 |
| 8 | B | 2 | 0 | 1 | 0 | 0 | 1 | 1 | 0 | 1 | 14 |
| 9 | C | F | 1 | 1 | 1 | 1 | 0 | 0 | 1 | 1 | 49 |
| A | A | 6 | 0 | 1 | 1 | 0 | 0 | 1 | 0 | 1 | 26 |
| B | 2 | 0 | 0 | 0 | 0 | 0 | 0 | 1 | 0 | 0 | 32 |
| C | A | 0 | 0 | 0 | 0 | 0 | 0 | 1 | 0 | 1 | 32 |
| D | 9 | D | 1 | 0 | 1 | 1 | 1 | 0 | 0 | 1 | 35 |
| E | 1 | 2 | 0 | 1 | 0 | 1 | 0 | 0 | 0 | 0 | 46 |
| F | A | 9 | 1 | 0 | 0 | 1 | 0 | 1 | 0 | 1 | 23 |

PULSE WIDTH MODULATED SINE COSINE GENERATOR

BACKGROUND OF THE INVENTION

1. Field of the Invention

This invention relates to a pulse width modulated sine and cosine wave generator.

2. Description of the Prior Art

In the field of numerical control, resolver and Inductosyn feedback devices requires two sine waves ninety degrees apart or in quadrature. These sine waves can of course be generated with elaborate equipment, but the simplest way to maintain the precise quadrature relationship is by the use of waves derived from a counter driven by a constant frequency clock. However, as is well known, square waves are rich in harmonic content so that considerable filtering is required. It is therefore recognized in the art that it would be helpful to eliminate or suppress the undesired odd harmonics, particularly the third, fifth and seventh, to reduce filtering requirements.

An article appearing in EDN published by Cahners Publishing Co. Inc., Boston, Mass. 02116 on Jan. 15, 1971 entitled "Reduce Static Inverter Weight and Cost by Harmonic Neutralization" — P. W. Koetsch, describes a technique for the suppression of the odd harmonics in a square wave output, utilizing a pulse width modulation technique. In this article there is described a static inverter, operating in the switching mode, that generates a square wave output that contains odd harmonics. Since the fundamental only was of interest, the pulse width technique was utilized to eliminate troublesome harmonics. In this technique, the on and off switching is controlled to produce a square pulse output wave of variable time width by using a stable oscillator and a countdown procedure.

The instant invention proposes to use the technique of pulse width modulation in a novel manner, to generate two sine waves exactly in quadrature, with minimal circuitry and greater flexibility in the selection of the pulse width pattern.

SUMMARY OF THE INVENTION

The present invention relates to a pulse width modulated sine and cosine wave generator. A read only memory (ROM) means is used to control the modulo of a counter. A first counting means addresses the ROM with all bit outputs save the most significant bit. The ROM has programmed outputs, two of which provide sine and cosine half cycle outputs (logic ONES and ZEROES) and the remaining programmed outputs are applied to the variable modulo counter. When the variable modulo counter has counted to its capacity it is enabled and an end of state signal is sent to the first counting means, which then advances to its next state, causing the ROM to have impending a new modulus for the variable modulo counter. When the variable modulo counter is enabled it receives the ROM output which is the modulo from the previous state of the first counting means.

Thus the duration of the state of the first counting means determines the duration of the logic ONES and ZEROES in the ROM sine and cosine half cycle outputs. The most significant bit of the first counting means, and the logic ONES and ZEROES of the ROM sine and cosine half cycle outputs are applied to circuitry for Boolean algebraic logic operations to derive pulse width modulated sine and cosine waves.

The ROM is programmed to provide a desired pulse width pattern. If it is desired to change this pattern to eliminate or minimize certain harmonics, this may be accomplished simply by replacing the ROM with one containing the desired data.

DESCRIPTION OF THE DRAWINGS

FIG. 2A, 2B are tables showing how the ROM of FIG. 1 is programmed to provide variable moduli.

DESCRIPTION OF A PREFERRED EMBODIMENT

Figure 1:
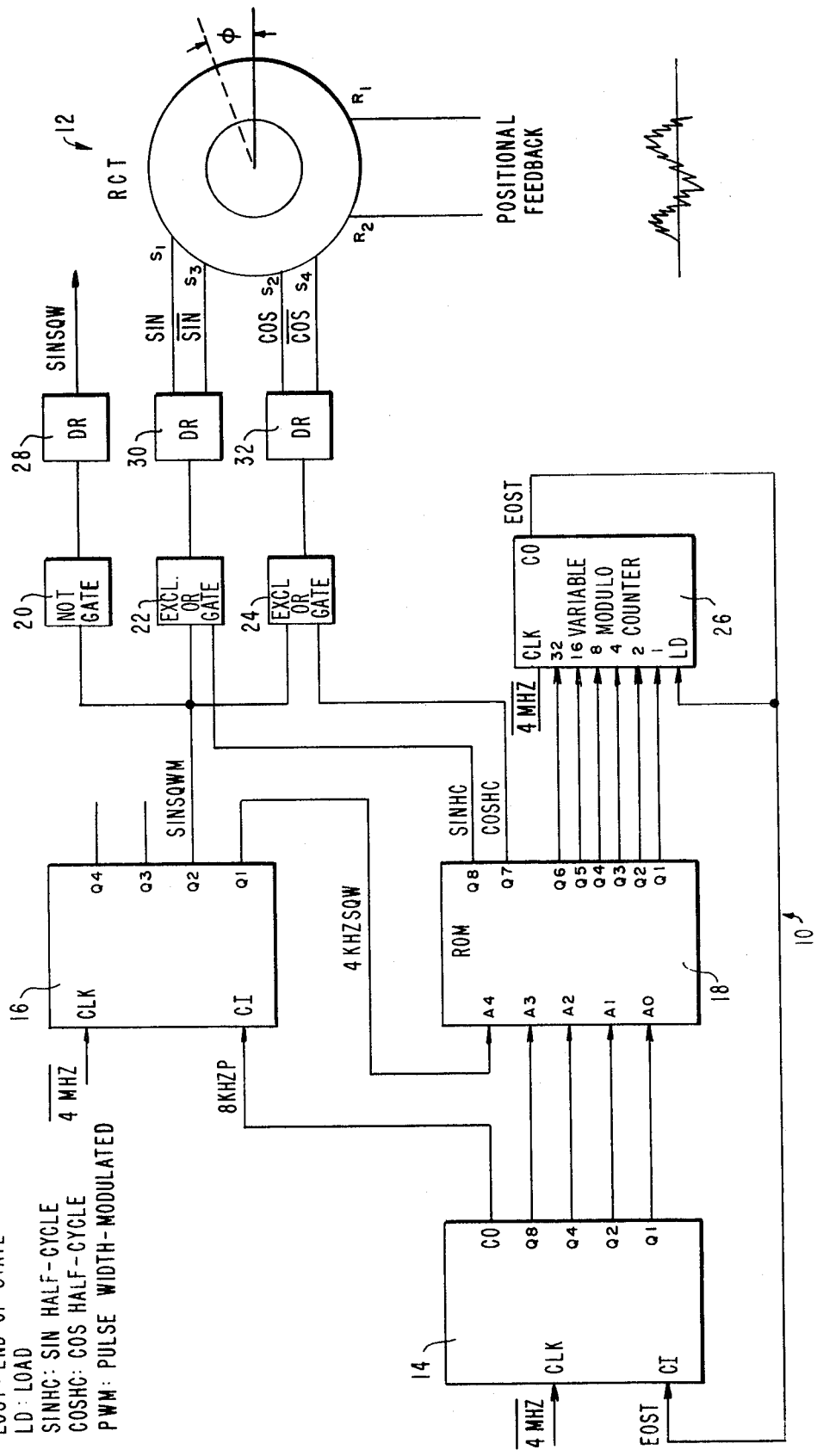
FIG. 1 is an electrical schematic of the pulse width modulated sine-cosine wave generator in accordance with the invention.

Referring now to FIG. 1, the pulse width modulated sin-cos generator of the invention is indicated generally at 10. This circuitry digitally generates: (a) a sine square wave SINSQW, (b) a pulse width modulated sin wave PWMSIN and (c) a pulse width modulated cos wave PWMCOS. These waves can be used for many applications requiring efficient generation of two sine waves in quadrature.

The invention is here illustrated as the excitation for a rotary control transformer (RCT) indicated generally at 12. Two sin waves are required to excite the stator windings $S_1 S_3$; $S_2$, $S_4$ of the rotary control transformer 12. These sine waves must be 90° apart or in quadrature. It is important that the quadrature relationship be maintained with a high degree of precision. The output of the RCT 12, taken from the rotor windings $R_1 R_2$, is an a.c. signal which is a function of the rotational displacement $\phi$ of the rotor. (When the RCT 12 is used in the numerical control, the sin square wave (SINSQW) is used as a mark for synchronization with other components).

The pulse width modulated sin-cos generator 10 comprises two binary 4 bit synchronous counters 14, 16, a read only memory (ROM) 18, NOT gate 20, EXCLUSIVE OR gates 22, 24, variable modulo counter 26, and drivers, 28, 30, 32.

Referring now to FIG. 2A and 2B, the ROM 18 is programmed to have the outputs $Q_1$ to $Q_8$ indicated in the tables. Counters 14 and 16 control the ROM address $A_0$, $A_1$, $A_2$, $A_3$, $A_4$. The counter 14 addresses the ROM through 16 states OO to OF (FIG. 2A). At the end of state OF, there is a carry in (CI) to counter 16. The ROM 18 now receives a ONE on its $A_4$ address, and is successively addressed 10 through 1F.

Looking at line OO in FIG. 2A, the hexadecimal code E9 is 1110 1001 i.e. the outputs $Q_8 \ldots Q_5$; $Q_4 \ldots Q_1$. The number 23 in binary form is 010111; the 2's complement of this number, 101001, is the ROM output $Q_6$ to $Q_1$. The ROM output is loaded into counter 26 and it becomes the modulus. The counters 14, 16 and 26 are clocked by the clock pulse 4MHz. The number 23 is the number of 4MHz pulses that the counter 26 must count. Counter 26 counts up until it reaches all ONES. At that time an end of state EOST signal is sent to counter 14. (The EOST signal also enables the counter 26). When the counter 14 receives the EOST signal it goes to the next state, putting in the next address to the ROM 18, which then outputs a new modulo to the counter 26. No new modulo is loaded into the counter 26 until it is enabled (LD). The status quo will be maintained until counter 26 counts up to all ONES and another end of state signal EOST is sent to the counter 14.

Referring again to FIGS. 2A and 2B, the $Q_7$ and $Q_8$ outputs of the ROM are the cosine half cycle COSHC and the sine half cycle SINHC respectively.

The 4 bit synchronous counter 14 has a modulus of 16. As is well appreciated by those in the art, counters (and registers too) cannot distinguish numbers which differ only by an integral multiple of its modulus. However, in order to simplify the dicussion, the second sequence of the counter wll be identified as going from 16-32, the third sequence from 32-48 etc., realizing of course, that the actual counter simply repeats itself over and over again.

Figure 3:
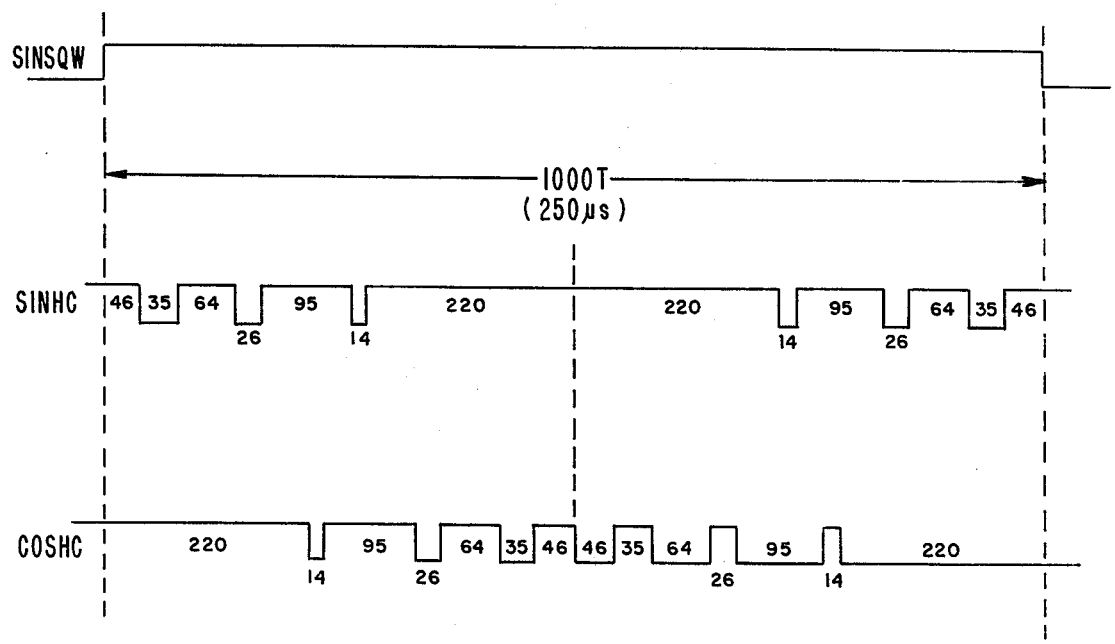
FIGS. 3 and 4 are wave forms used in explaining the operation of the invention.

Referring now to FIGS. 1 and 3, the generation of the sine square wave (SINSQW) is as follows. The output $Q_2$ of counter 16 is connected to NOT gate 20 so that the inversion of its logic state is gated to driver 28. At the outset, assume that the outputs of $Q_1$ and $Q_2$ of counter 16 are logic ZEROES. Counter 14 counts up to 16 and a carry in (CI) pulse of 8 kilo Hz is sent to counter 16, whereupon the output $Q_1$ of counter 16 is changed to a logic ONE. ($Q_2$ remains ZERO). The $Q_1$ output of counter 16 is appled to ROM 18 as address $A_4$. Counter 14 begins its second sequence which will be identified as counting from 16-32. When all ONES are reached, counter 16 sends a C.I. to counter 16, changing $Q_1$ to ZERO, and changing $Q_2$ to a logic ONE. Counter 14 counts now from 32 to 48, and sends CI to counter 16, changing $Q_1$ to a logic ONE ($Q_2$ remains a logic ONE). Counter 14 counts from 48 to 64, sending a C.I. to counter 16. Output $Q_1$ goes from logic ONE to logic ZERO, and $Q_2$ goes from a logic ONE to logic ZERO. In summary, $Q_2$ has been a ZERO for two count sequences of counter 14, and has been a ONE for the next two count sequences of counter 14. These logic states are inverted by NOT gate 20 and applied to driver 28 to provide SINSQW.

The generation of the SINHC and COSHC is essentially the same, so that only the SINHC output will be explained. The SINHC is the output $Q_8$ of ROM 18. As will be seen from a study of FIG. 2A, 2B, $Q_8$ changes from ONE to ZERO in a predetermined sequence.

In order to make clear the generation of SINHC the following table is presented:

| LINE NO. | ROM | COUNTER 26 MODULUS | SINHC |
|---|---|---|---|
|  |  | 46 |  |
| 1F | 23 → | 23 | 1 |
| 00 | 23 → | 23 | 1 |
| 01 | 35 → | 35 | 1 |
| 02 | 32 | 32 | 0 |
| 03 | 32 | 32 | 1 |
| 04 | 26 | 26 | 1 |
| 05 | 49 | 49 | 0 |
| 06 | 14 | 14 | 1 |
| 07 | 32 | 32 | 1 |
| 08 | 14 | 14 | 1 |
| 09 | 49 | 49 | 0 |
| 0A | 26 |  | 1 |

Assume that the counters 14, 16 are at line 1F (FIG. 2B) the ROM's impending output $Q_1$ to $Q_6$ is 23, counter 26 has a modulus 46 and SINHC is a ONE. When counter 26 counts 46 pulses, an EOST signal is sent to counter 14, and it goes to the next line OO. The EOST signal is also the load signal (LD) to counter 26 and the previous ROM state $Q_1 - Q_6$ i.e. 23, is now loaded into counter 26; this becomes the new modulo for counter 26. When the counter 14 goes to the next line, OO ROM 18 receives a new address $A_0 - A_5$, and is now ready to send a new output $Q_1 \ldots Q_6$ which is again 23. Counter 26 now counts 23 pulses and EOST is sent to counter 14. At line 01 the ROM's impending outut $Q_1 \ldots Q_6$ is 35; counter 26 receives the output 23 from ROM 18. Counter 26 now counts 23 pulses whereupon the end of state signal EOST is sent to counter 14 sending it to the next line 02, and counter 16 receives the ROM output 35. ROM now has the state $Q_1 \ldots Q_6 = 32$. Counter 26 now counts 35 pulses, and then sends to EOST to counter 14 indexing it to line 03.

At this point it will be convenient to summarize what has taken place. From line 00 to 01, the counter 26 has counted 46 pulses (23 + 23), and the SINHC has remained ONE. At step 02, counter 26 has counted 35 pulses and SINHC is a ZERO. This is shown in FIG. 3, where the SINHC is a ONE for 46 counts and a ZERO for 35 counts.

In line 03 and 04 the counter 26 will count 64 pulses (32 + 32) and the SINHC will be ONE. For line 05 counter 26 wll count 26 pulses and the SINHC will be ZERO. For lines 06 to 08, the counter 26 will count 95 pulses (49 + 14 + 32), while SINHC will be ONE. For line 09 counter 26 will count 14 pulses and the SINHC will be ZERO. These counting periods, as well as the logic state of sin HC and COSHC are shown in FIG. 3, for one half cycle i.e. 1000T.

As had been assumed earlier the output $Q_2$ of counter 16 is a ZERO for counts 1-32 and a ONE 32-64. When $Q_2$ is ZERO, the EXCLUSIVE — OR's 22 and 24 will have a ONE output only when the other input i.e. SINHC or COSHC is a ONE. When $Q_2$ becomes a ONE, they will have a ONE output only when the other input is ZERO.

Figure 4:
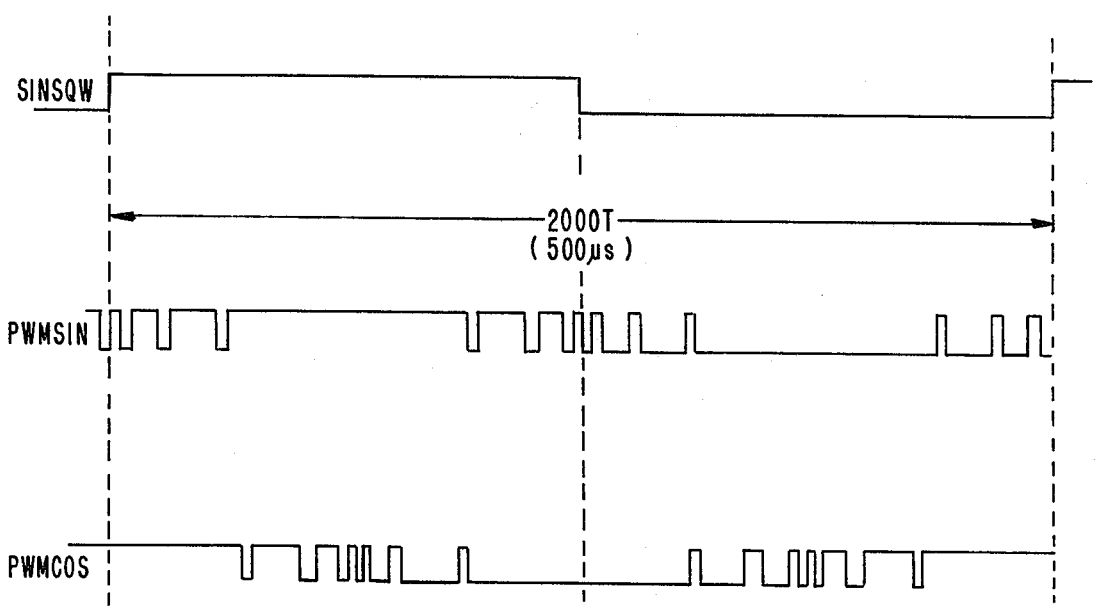

In this manner the EXCLUSIVE OR gates deliver the pulse width modulated sin (PWMSIN) and cosine (PWMCOS) wave patterns depicted in FIG. 4.

The pulse width pattern is determined by mathematical analysis.

In summary, the counters 14, 16 have 32 states i.e. a modulo 32 counter. The variable-modulo counter 26 changes state every 4MHz clock pulses. The EOST out of counter 26 is one clock period wide and is used to gate a number generated by the ROM to preset the counter 26 at the next clock pulse. The EOST signal advances the modulo 32 counter to its next state at the same time as the variable modulo counter 26 is being preset. The ROM 18 acts as a look up table, selecting the proper number (modulo) to preset the variable modulo counter 26, thus establishing the duration (in terms of MHz clock pulses) of the next state of the modulo 32 counter. The counter 14, 16 can generate the desired pulse width modulated signals PWMSIN and PWMCOS, if the ROM is programmed such that each state of the modulo counter 14, 16 has the desired pulse width or duration.

In order to simplify the design, in the practical embodiment, the maximum duration of the modulo 32 counter is kept at 64 clock pulses. In cases where the pulse width requires a longer duration, successive modulo 32 counter 14, 16 states are used until the correct duration is attained and/or until all 32 states are used.

The second function of the ROM 18 is to decode the five least significant bits of the modulo 32 counter and output the desired logic state ("1" or "0") for the PWMSIN and PWMCOS during that particular state of the modulo 32 counter 14, 16. Because of the symmetry of the sine and cosine, only a half cycle is encoded, and the most significant bit of the modulo 32 counter 14, 16 (SINSQW) is utilized by means of a pair of EXCLUSIVE-OR gates to complement the encoded states which repeat for the second half cycle, to produce the desired PWMSIN and PWMCOS waves.

The ue of ROM control of the generator and for decoding the discrete logic states, enable the utilization of minimal circuitry, but nevertheless provides great flexibility in the selection of the pulse wave pattern.

The harmonic content of the PWSIN and PWCOS signals can be tailored to minimize certain harmonics of the carrier frequency to accommodate particular gain-bandwidth characteristics of different resolver type devices. This can be accomplished by changing the widths or durations of the discrete pulses during a half cycle of the carrier frequency. This pulse width customizing is accomplished simply by replacing the ROM 18 with another ROM containing the required modulo outputs.

I claim:

1. A digital waveform generator for deriving sine and cosine waves by pulse width modulation comprising:
   counting means having a plurality of states, comprising a plurality of lesser significant bits and a most significant output bit;
   read only memory (ROM) means having a plurality of address inputs for receiving said lesser significant bits and having a plurality of programmed output bits, two of said latter bits defining a sine half cycle (SINHC) and a cosine half cycle (COSHC), the remaining ROM output bits defining a modulo,
   variable modulo counting means having a plurality of inputs connected to receive said modulo output from said ROM means, and to deliver an end of state (EOST) signal to said counting means;
   means for clocking connected to said counting means and to said variable modulo counting means, whereby
   when the variable modulo counter has counted to its capacity the EOST signal is sent to said counting means, and said variable modulo counter is enabled, the counting means then advancing to its next state to provide the next ROM address and the next programmed ROM modulo output, the ROM modulus output from the previous state of said counting means now becoming the next modulo for said variable modulo counter; and
   logic means for receiving said most significant output bit and said SINHC and COSHC bit signals, for performing algebraic logic operations to provide pulse width modulated sine and cosine waveforms respectively, the modulated width of said waves being a function of the duration of the states of said counting means respectively.

2. A digital waveform generator according to claim 1 wherein, said logic means comprises a pair of EXCLUSIVE-OR gates, each having said most significant output bit as one input, the other one input being said SINHC and COSHC bits respectively.

3. A digital waveform generator according to claim 1 wherein, aid counting means is a 32 modulo counter, and said clocking means is a 4MHz clock pulse.

4. A digital waveform generator according to claim 1 wherein, said counting means are first and second 4 bit synchronous counters, said first 4 bit counter receiving said EOST signal and sending a carry in (CI) signal to said 4 bit counter, one bit output of said second 4 bit counter being one of said plurality of lesser significant bits, another bit output of said second 4 bit counter being said most significant output bit.

5. A digital waveform generator according to claim 1 wherein, said variable modulo counting means has a maximum capacity of 64 states, and greater pulse width durations for said waveforms are obtained by using successive states of said counting means.

6. A digital waveform generator for deriving pulse width modulated sine and cosine waves comprising;
   first and second 4 bit synchronous counters, said first 4 bit synchronous counter being connected to send a carry in (CI) signal to said second 4 bit synchronous counter, the output bits of said first 4 bit counter and one bit of said second 4 bit counter providing lesser significant output bits, another bit of the second 4 bit synchronous counter providing the most significant output bit;
   read only memory (ROM) means having a plurality of address inputs for receiving said lesser significant bits, and having a plurality of programmed output bits, two of said latter bits defining a sine half cycle (SINHC) and cosine half cycle (COSHC), the remaining output bits of said ROM means defining successive moduli;
   variable modulo counting means having a plurality of inputs connected to receive said moduli output from said ROM means, and to deliver an end of state (EOST) signal to said first 4 bit synchronous counter;
   clock pulse means connected to said first and second 4 bit synchronous counters, and to said variable modulo counting means;
   whereby when the variable modulo counter has counted to its capacity, the EOST signal is set to the first 4 bit synchronous counter, and said variable modulo counter is enabled, the first and second 4 bit synchronous counters, respectively advancing to the next state to provide the next ROM address and the next programmed ROM modulo output, the ROM output modulo from the previous state of the first and second 4 bit counter now becoming the next modulo for said variable modulo counter; and
   logic means for receiving said most significant output bit and said SINHC and COSHC bit signals, for manipulation in Boolean algebraic logic to provide pulse width modulated sine and cosine waveforms respectively, the modulated time width of said waves being a function of the duration of the states of said first and second synchronous counters.

7. A digital waveform generator according to claim 6 wherein, said logic means comprises a pair of EXCLUSIVE-OR gates, each having said most significant output bit as one input, the other one input being SINHC and COSHC bit signals respectively.

8. A digital waveform generator according to claim 6 wherein, said variable modulo counting means has a maximum capacity of 64 states, and greater pulse width durations for said waveforms is obtained by using successive states of said first and second 4 bit synchronous counters respectively.

* * * * *